(12) United States Patent
Garan et al.

(10) Patent No.: US 12,078,817 B2
(45) Date of Patent: Sep. 3, 2024

(54) GEOMETRIC PHASE BASED MOTION COMPENSATION FOR SHEAROGRAPHY

(71) Applicant: BAE Systems Information and Electronic Systems Integration Inc., Nashua, NH (US)

(72) Inventors: Jacob D. Garan, Boulder, CO (US); Michael J. DeWeert, Kaneohe, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 134 days.

(21) Appl. No.: 17/565,124

(22) Filed: Dec. 29, 2021

(65) Prior Publication Data

US 2023/0204970 A1    Jun. 29, 2023

(51) Int. Cl.
G02B 27/48 (2006.01)
G01B 11/16 (2006.01)
G02B 27/28 (2006.01)

(52) U.S. Cl.
CPC ............ *G02B 27/48* (2013.01); *G01B 11/162* (2013.01); *G02B 27/283* (2013.01)

(58) Field of Classification Search
CPC ..... G02B 27/48; G02B 27/283; G01B 11/162
USPC ........................................................ 359/489
See application file for complete search history.

(56) References Cited

U.S. PATENT DOCUMENTS

| 7,933,003 | B2 | 4/2011 | Meldahl et al. |
| 8,717,577 | B1 | 5/2014 | Kokubun et al. |
| 10,466,038 | B1 | 11/2019 | Kokubun et al. |
| 2011/0188120 | A1 | 8/2011 | Tabirian et al. |
| 2019/0145821 | A1 | 5/2019 | Forbes |
| 2021/0055567 | A1 | 2/2021 | Kokubun et al. |

OTHER PUBLICATIONS

International Search Report, PCT/US22/54234, mailed Jun. 8, 2023, 12 pages.
Michael J. Escuti, Jihwan Kim, and Michael W. Kudenov, Geometric-Phase Holograms, Optics & Photonics News Magazine, Feb. 1, 2016, pp. 22-29, vol. 32, Issue Feb. 2021, Optica, Washington, DC, USA.
Peng Chen, Bing-Yan Wei, Wei Hu, and Yan-Qing Lu, Liquid-Crystal-Mediated Geometric Phase: From Transmissive to Broadband Reflective Planar Optics, Advanced Materials, Sep. 30, 2019, pp. 1-21, vol. 32, No. 27, Wiley-VCH Verlag Gmbh & Co. KGaA, Weinheim, Germany.
Non-Mechanical Digital Beam Steering Systems, https://www.beamco.com/Non-Mechanical-Digital-Beam-Steering-Systems, BEAM Co., 1 page, document is undated.

*Primary Examiner* — Joseph P Martinez
*Assistant Examiner* — Grant A Gagnon
(74) *Attorney, Agent, or Firm* — Sand, Sebolt & Wernow LPA; Gary McFaline

(57) ABSTRACT

A laser transmission assembly for shearography and related systems utilizing transmissive geometric phase plate pairs in place of Risley prism pairs or movable mirrors therein. Transmissive geometric phase plates provide for a system that is more compact than systems utilizing mirrors or Risley prism pairs while maintaining or improving the adjustability of the system and further offering beamshaping to provide desired illumination patterns.

10 Claims, 6 Drawing Sheets

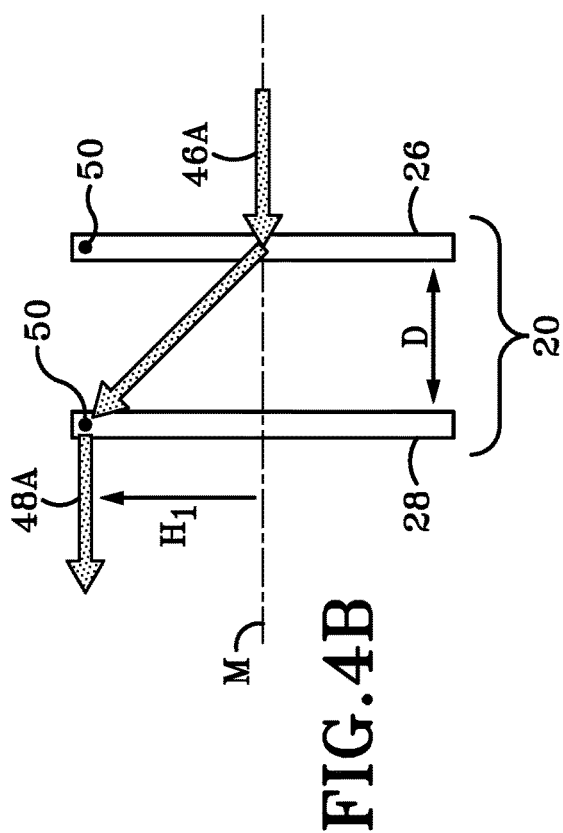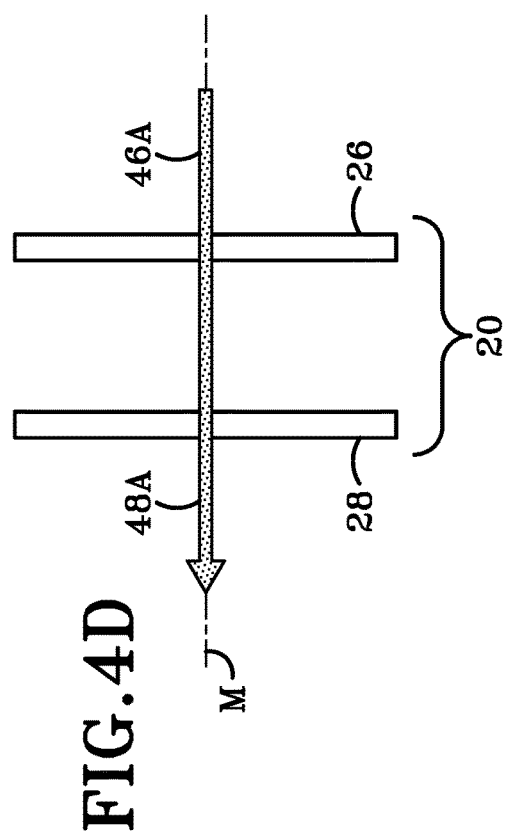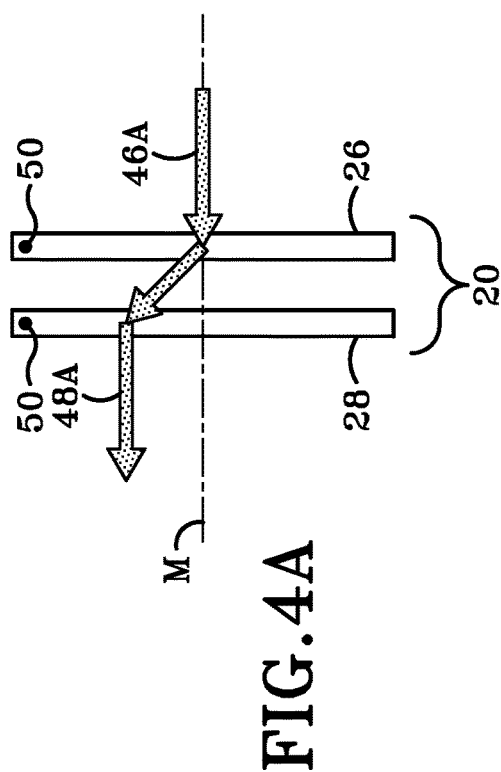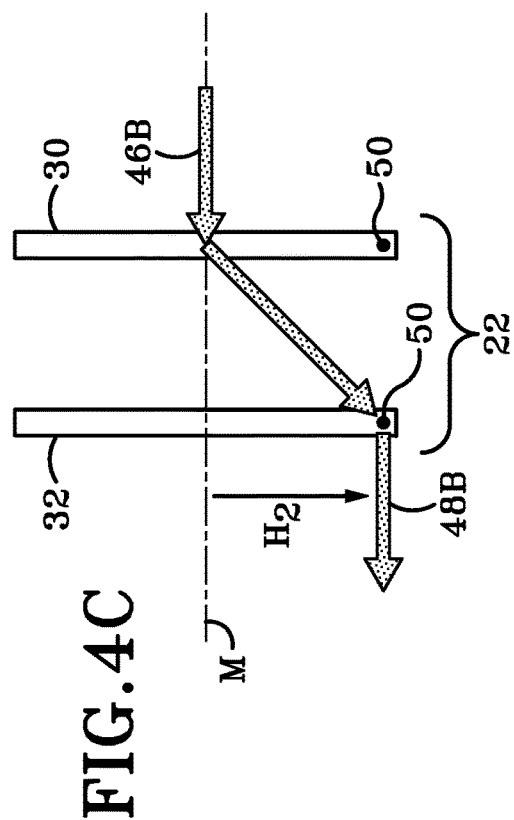

GEOMETRIC PHASE BASED MOTION COMPENSATION FOR SHEAROGRAPHY

TECHNICAL FIELD

The present disclosure relates generally to the field of shearography. More particularly, in one example, the present disclosure relates to a laser transmission system utilizing beam steering for motion compensation for shearography. Specifically, in another example, the present disclosure relates to a laser transmission system utilizing geometric phase-based beam steering techniques to compensate for motion of the transmission system for shearography.

BACKGROUND

Shearography, or speckle pattern shearing interferometry as it is sometimes called, is a non-destructive measuring and testing method utilizing coherent light or sound waves to provide information about the quality of different materials. Generally speaking, shearography uses comparative images, known as shear images or shearograms, of a surface or object both with and without a load applied to the target surface or object to create an interference pattern known as a specklegram. The interference pattern is created by using a reference image of the test object and shearing that image to create a double image. Superimposing those two images upon each other provides a shear image (shearogram) representing the surface of the test object in a first state, which is typically an unloaded state. Then a load is applied to the surface or test object to cause a minor deformation therein. From this a second shear image is generated and is compared with the first shear image to reveal inconsistencies between the two, which in turn may represent a flaw in the surface or the presence of an unknown or unseen object within or below the surface.

When shearography is performed by a stationary system, obtaining two images of the same surface taken from the same angle and under the same conditions is relatively simple. In particular, a stationary shearography system may take the first shear image, apply stress to the surface, and take the second shear image shortly thereafter. Since the system remains still, these images may be taken using the same transmission assembly and same coherent laser light source. In these applications, the only variable becomes the stress intentionally introduced to the surface.

In contrast, performing shearography from a moving platform becomes significantly more difficult, as the movement of the platform, transmission assembly, and receiver must all be accounted for and effectively eliminated from the final images. In particular, the ability to fire two measurement lasers to the same spot on the same surface separated by a measure of time, and receive the reflections from those laser pulses, all from a moving platform, requires compensation for the motion of the transmission assembly, the motion of the receiver, and the effects and/or distortion on the measurement laser introduced into the system. When the system is not stationary, this movement of the transmission assembly and/or the receiver can reduce the correlation between the reference shear image and the measurement shear image, which may further introduce error into the results thereby invalidating or otherwise corrupting the test.

Current solutions for performing shearography from a moving platform include mechanical solutions, mathematical solutions, and combinations thereof on both the transmission and receiver sides of a shearography system. Current mechanical solutions include movable optical components with switching times, such as mirrors, lens, and the like to compensate for the motion of these components that need to be moved quickly as the lasers are generated to produce shear images. Moving such components and the resulting speed at which they need to be moved can result in complex and expensive systems, which may require regular and highly technical maintenance. Further, many of these current mechanical solutions involve mechanical components that tend to reduce the output power of the transmission laser beams (such as reflective beam splitters), thus requiring higher power (i.e. larger and more expensive) laser beams to be used. Other mechanical solutions, such as Risley prisms and/or movable mirrors, may further introduce limits on the degree to which a beam may be steered. Specifically, Risley prisms may limit the steering by the index of refraction, requiring increasingly larger prisms to maximize the steerability of the beam. Similarly, movable mirrors introduce a limit on how close to zero the measurements may be taken. Thus, in order to achieve higher angles of steering, larger prisms and/or mirrors must be used, increasing the size, weight, and cost of such systems.

Current mathematical solutions include utilizing complex mathematical algorithms and/or processing software, often in conjunction with mechanical motion compensation devices, such as those discussed above. These processes may allow for additional error to be introduced during the processing steps through introduction of variables and corruption in the data collection and/or transfer.

While some of these currently utilized solutions may be adjustable depending on the specific implementation needs, oftentimes these solutions involve increasing the size, weight, power consumption and/or cost of shearography systems, which may further introduce additional optical distortion in the process.

SUMMARY

The present disclosure addresses these and other issues by providing a laser transmission assembly for shearography and related systems utilizing transmissive geometric phase plate pairs in place of Risley prism pairs or movable mirrors therein. The use of transmissive geometric phase plates may provide a system that is more compact than systems utilizing mirrors or Risley prism pairs while maintaining or improving the adjustability of the system and further offering the possibility of beamshaping to provide desired illumination patterns.

In one aspect, an exemplary embodiment of the present disclosure may provide a laser transmission assembly comprising: a polarizing beam splitter operable to direct a first laser beam pulse and a subsequent second laser beam pulse through a series of optical components within the transmission assembly; and at least one pair of geometric phase (GP) plates; wherein the at least one pair of GP plates are operable to steer the first laser beam pulse away from a midline axis of the transmission assembly in a first direction and to steer the second laser beam pulse away from the midline axis of the transmission assembly in a second direction such that the first and second laser beam pulses appear to originate from a single point. This exemplary embodiment or another exemplary embodiment may further provide wherein the at least one pair of GP plates further comprises: a first pair of GP plates operable to steer the first laser beam pulse away from the midline axis of the transmission assembly in the first direction; and a second pair of GP plates operable to steer the second laser beam pulse away from the midline axis of the transmission assembly in the second direction. This exemplary embodiment or another exemplary embodiment may further provide wherein the first pair of GP plates further comprise: a first liquid crystal modulated geometric phase grating operable to steer the first beam pulse away from the midline axis at an angle thereto; and a second liquid crystal modulated geometric phase grating operable to steer the first beam pulse back into parallel with the midline axis. This exemplary embodiment or another exemplary embodiment may further provide wherein the second pair of GP plates further comprise: a third liquid crystal modulated geometric phase grating operable to steer the second beam pulse away from the midline axis at an angle thereto; and a fourth liquid crystal modulated geometric phase grating operable to steer the second beam pulse back into parallel with the midline axis. This exemplary embodiment or another exemplary embodiment may further provide wherein the first and second liquid crystal modulated geometric phase gratings are movable to increase and decrease the degree of beam displacement of the first laser beam pulse from the midline axis of the transmission assembly by increasing and decreasing the distance between the first and second liquid crystal modulated geometric phase gratings; and wherein the third and fourth liquid crystal modulated geometric phase gratings are movable to increase and decrease the degree of beam displacement of the second laser beam pulse from the midline axis of the transmission assembly by increasing and decreasing the distance between the third and fourth liquid crystal modulated geometric phase gratings. This exemplary embodiment or another exemplary embodiment may further provide wherein the first and second liquid crystal modulated geometric phase gratings are oriented in an opposite direction from the third and fourth liquid crystal modulated geometric phase gratings. This exemplary embodiment or another exemplary embodiment may further provide a movable platform operable to carry the transmission assembly thereon. This exemplary embodiment or another exemplary embodiment may further provide wherein the movable platform is operable to travel from a first position to a second position between the first laser beam pulse and the subsequent second laser beam pulse. This exemplary embodiment or another exemplary embodiment may further provide wherein the first beam pulse is displaced from the midline axis in the first direction by a distance equal to at least a portion of a distance traveled by the movable platform between the first and second positions. This exemplary embodiment or another exemplary embodiment may further provide wherein the second beam pulse is displaced from the midline axis in the second direction by a distance equal to the remainder of the distance traveled by the movable platform between the first and second positions. This exemplary embodiment or another exemplary embodiment may further provide wherein the combined displacement of the first beam pulse from the midline axis in the first direction and the displacement of the second beam pulse from the midline axis in the second direction is equal to the total distance the movable platform travels between the first and second positions.

In another aspect, an exemplary embodiment of the present disclosure may provide a method of performing shearography comprising: directing a first laser beam pulse from a first beam generator through a series of optical components within a transmission assembly carried by a platform; displacing the first beam pulse laterally away from a midline axis of the transmission assembly in a first direction with a first pair of geometric phase (GP) plates; directing the first beam pulse towards a target spot on a surface remote from the transmission assembly and platform; generating a first shear image from the first beam pulse; moving the platform from a first position to a second position; directing a second laser beam pulse from a second beam generator through the series of optical components within the transmission assembly; displacing the second beam pulse laterally away from the midline axis of the transmission assembly in a second direction with a second pair of GP plates; directing the second beam pulse towards the same target spot on the surface remote from the transmission assembly and platform; generating a second shear image from the second beam pulse; and comparing the first and second shear images to generate a shearogram. This exemplary embodiment or another exemplary embodiment may further provide wherein the first pair of GP plates further comprise: a first liquid crystal modulated geometric phase grating; and a second liquid crystal modulated geometric phase grating. This exemplary embodiment or another exemplary embodiment may further provide increasing the degree of beam displacement of the first laser beam pulse from the midline axis of the transmission assembly by increasing the distance between the first and second liquid crystal modulated geometric phase gratings; and decreasing the degree of beam displacement of the first laser beam pulse from the midline axis of the transmission assembly by decreasing the distance between the first and second liquid crystal modulated geometric phase gratings. This exemplary embodiment or another exemplary embodiment may further provide wherein the second pair of GP plates further comprise: a third liquid crystal modulated geometric phase grating; and a fourth liquid crystal modulated geometric phase grating. This exemplary embodiment or another exemplary embodiment may further provide increasing the degree of beam displacement of the second laser beam pulse from the midline axis of the transmission assembly by increasing the distance between the third and fourth liquid crystal modulated geometric phase gratings; and decreasing the degree of beam displacement of the second laser beam pulse from the midline axis of the transmission assembly by decreasing the distance between the third and fourth liquid crystal modulated geometric phase gratings. This exemplary embodiment or another exemplary embodiment may further provide wherein steering the first beam pulse away from the midline axis of the transmission assembly in the first direction further comprises: steering the first beam pulse a distance away from the midline axis equal to at least a portion of a distance the platform travels between the first and second position. This exemplary embodiment or another exemplary embodiment may further provide wherein steering the second beam pulse away from the midline axis of the transmission assembly in the second direction further comprises: steering the second beam pulse a distance away from the midline axis equal to the remainder of the distance the platform travels between the first and second positions. This exemplary embodiment or another exemplary embodiment may further provide wherein the combined displacement of the first beam pulse from the midline axis in the first direction and the displacement of the second beam pulse from the midline axis in the second direction is equal to the total distance the movable platform travels between the first and second positions.

In yet another aspect, an exemplary embodiment of the present disclosure may provide a method of steering a beam comprising: directing a first laser beam pulse through a series of optical components; steering the first beam pulse laterally away from a midline axis of the transmission assembly in a first direction with a first pair of liquid crystal modulated geometric phase (LCGP) plates that do not have a voltage applied thereto; applying a voltage to a second pair of LCGP plates to allow the first beam pulse to pass therethrough unaffected; directing a second laser beam pulse through the series of optical components; applying a voltage to the first pair of LCGP plates to allow the second beam pulse to pass therethrough unaffected; and steering the second beam pulse laterally away from the midline axis of the transmission assembly in a second direction distinct from the first direction with a second pair of LCGP plates that do not have a voltage applied thereto.

BRIEF DESCRIPTION OF THE SEVERAL VIEWS OF THE DRAWINGS

FIG. 4A is a side elevation operation view of a geometric phase plate pair in a first configuration according to one aspect of the present disclosure.

FIG. 4B is a side elevation operation view of a geometric phase plate pair in a second configuration according to one aspect of the present disclosure.

FIG. 4C is a side elevation operation view of a geometric phase plate pair in a third configuration according to one aspect of the present disclosure.

FIG. 4D is a side elevation operation view of a geometric phase plate pair in a fourth configuration according to one aspect of the present disclosure.

DETAILED DESCRIPTION

Figure 1:
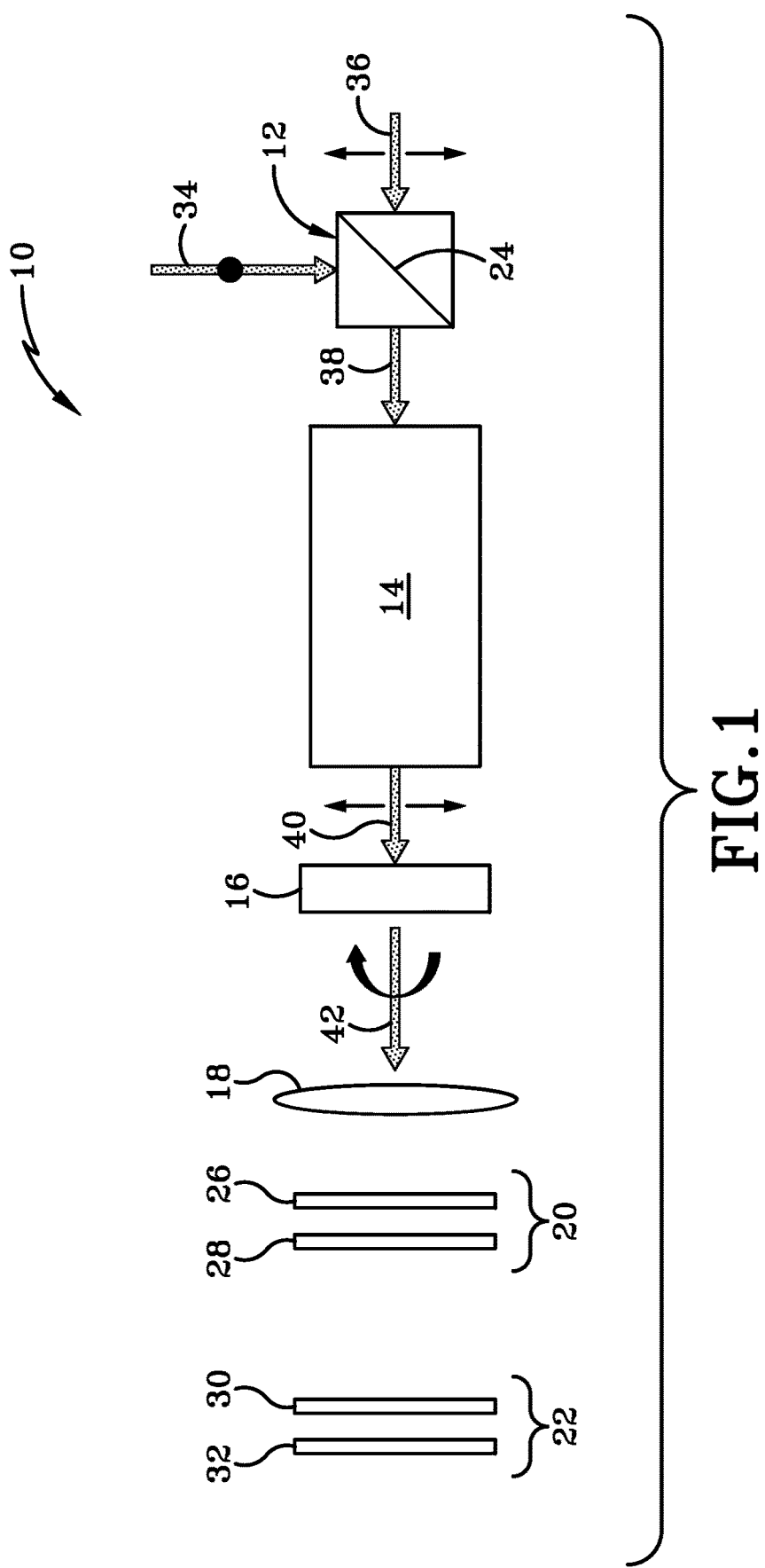
FIG. 1 is a side elevation schematic view of a laser transmission assembly according to one aspect of the present disclosure.

With reference to FIG. 1, a laser transmission assembly is shown and generally referred to herein as transmission assembly 10. Generally speaking, transmission assembly 10 may be a part of a larger shearography system having both the transmission assembly 10 described herein and a receiver or receiving system. This larger shearography system may be operable to transmit a laser beam to a surface to be measured and receive a reflection of the beam to process the information therein to form a specklegram. The present disclosure is addressed to a transmission assembly 10 utilized for the transmission of the laser beam to the surface being measured. While the disclosure is limited in that sense, it will be understood that the present disclosure is not limited to use in conjunction with any particular receiving system, or as part of any particular shearography system. Instead, the transmission assembly 10 described herein may be used with any suitable receiving system, within any suitable shearography system, or may be readily adapted for use in other laser transmission applications where beam steering may be applicable, as desired.

In particular, transmission system 10 may be utilized in other applications where it may be beneficial to provide multiple laser pulses that maintain the laser origin point and propagation direction constant of a series of laser images which may include any application that benefits from maintaining relative phase coherence across the illuminated field of view, any application that benefits from maintaining coherence of illumination over time, any application in which parallax errors over time are important, and any application benefiting from precise control of the spatial or temporal illumination pattern on the ground. By way of one non-limiting example, such additional applications may include structured illumination, which involves projecting a series of patterns of light on the ground and taking precise shape measurements of objects by comparing reflected light between pattern-illuminated images. According to another non-limiting example, transmission assembly 10 may be used for RF-modulated LIDAR-RADAR. The temporal phase of the RF modulation allows precise ranging to remote objects which requires holding the line of sight and pulse origin to a small fraction of the RF-modulation wavelength. According to yet another example, transmission assembly 10 may be used for amplitude-modulated LIDAR, which has a lower risk of range ambiguity than RF-modulated LIDAR-RADAR and provides similar benefits as RF-modulated LIDAR-RADAR, but with exploitation of arbitrary pulse-shape modulations. According to yet another example, transmission assembly 10 may be used for Doppler LIDAR to reduce errors due to platform motion in computing Doppler shifts. According to yet another example, transmission assembly 10 may be used for Synthetic Aperture LIDAR and may provide improved robustness versus platform motion variability.

Transmission assembly 10 may include series of optical components, including a polarizing beam splitter (PBS) 12 and a Pockels cell/polarization rotator 14, a quarter-wave plate (QWP) 16, a diverging lens 18, and a low angle of incidence dependence QWP 44. Transmission assembly 10 may further include a first geometric phase (GP) plate pair 20 and a second GP plate pair 22. First GP plate pair may further include a first GP plate 26 and a second GP plate 28, while second GP pair may further include a third GP plate 30 and a fourth GP plate 32.

PBS 12 may be any suitable or standard polarizing beam splitter having at least one optical surface 24 therein. PBS 12 may be constructed of any suitable optical material including standard optical glass or other similar materials and may include the optical surface 24 immersed therein. Optical surface 24 may include additional coatings or treatments, as desired, to produce a desired effect on a laser beam traveling through PBS 12 and may be any suitable transmissive and/or reflective coatings as dictated by the desired implementation thereof. PBS 12 may be utilized to act as a zero loss beam combiner directing one laser beam, such as first beam 34, from a first source direction and a second laser beam, such as second beam 36, fired from a second direction to impinge the beams on the Pockels cell/polarization rotator 14 at the same angle, as discussed further herein.

Pockels cell/polarization rotator 14, or as simply referred to hereinafter rotator 14 may be any suitable polarization rotating device including Pockels cell rotators utilizing voltage-controlled wave plates or the like to rotate the polarization of a beam entering the rotator 14 to induce a change in polarization within the beam. As used and contemplated herein, rotator 14 may be operable to convert a beam from one polarization stage to another polarization stage. According to another example, rotator 14 may be utilized to ensure that the beam exiting rotator 14 (such as beam 40) has the same polarization regardless of the polarization of the input beam (such as beam 38) which may match the polarization of the first and/or second beams 34 and 36, as discussed further below. As rotator 14 may be voltage-controlled, it will be understood to include any suitable and/or necessary electrical components or connections therewith for standard and normal operation thereof.

QWP 16 may be any suitable optical element operable to alter the polarization of the beam (e.g. linearly polarized beam 40) exiting the rotator 14 from having a linear polarization to circular polarization. According to one aspect, QWP 16 may be constructed out of any suitable birefringent material and may have any suitable treatments or coatings applied thereto to effect the desired controlled phase shift between the linearly polarized beam and a circularly polarized beam, as discussed further below.

Diverging lens 18 may be any suitable diverging optical component constructed of any suitable optical material. Diverging lens 18 may have any profile, shape, size or thickness as dictated by the desired effect on a beam passing therethrough, as described further below. According to one aspect, the diverging lens 18 may be configured to reduce the intensity of the beam to prevent burning or otherwise damaging the GP plate pairs 20 and 22.

As mentioned above, the first GP plate pair 20 may include first GP plate 26 and second GP plate 28. As described more thoroughly below, first and second GP plates 26 and 28 may provide a desired steering effect on a first pulse laser beam exiting transmission assembly 10. Similarly, second GP plate pair 22 may have a pair of GP plates, namely third GP plate 30 and fourth GP plate 32 and may provide a desired steering effect on a second pulse laser beam, as described further below.

First, second, third, and fourth GP plates 26, 28, 30, and 32 may be substantially similar to one another and may be provided in the previously mentioned dual-paired arrangement to produce a desired effect on two separate polarized single-mode lasers, such as first and second laser beams 34 and 36, as described herein. GP plates 26, 28, 30, and 32 may be liquid crystal modulated geometric phase gratings having a liquid crystal film and/or liquid crystal polymer film overlaid on a substrate, which may be any suitable transparent material, including plastics, optical glass, or the like.

GP plates 26, 28, 30, and 32 may provide non-mechanical digital beam steering effects that may be further enhanced with additional mechanical applications. In particular, GP plates 26, 28, 30, and 32, or more particularly GP plate pairs 20 and 22, may be further engaged or controlled by one or more motors which may provide movement and/or separation between the plates of each pair 20 and 22. For example, first GP plate pair 20 may have two motors, with one for increasing the separation between first GP plate 26 and second GP plate 28, which may change the interpulse distance therebetween and with the other motor for rotating first and second GP plates 26 and 28 to change the motion compensation direction. Similarly, second GP plate pair 22 may include two motors, one for changing the separation between third and fourth GP plates 30 and 32 and a second for rotating second plate pair 22 to change the motion compensation direction. These movements and their effects on a laser beam are discussed more below with regards to the operation of transmission assembly 10 below. Motors provided with GP plate pairs 20 and 22 may be any suitable motors operable connection with plate pairs 20 and 22 and may include any further elements or components as needed to facilitate the normal and expected operation thereof.

Figure 2:
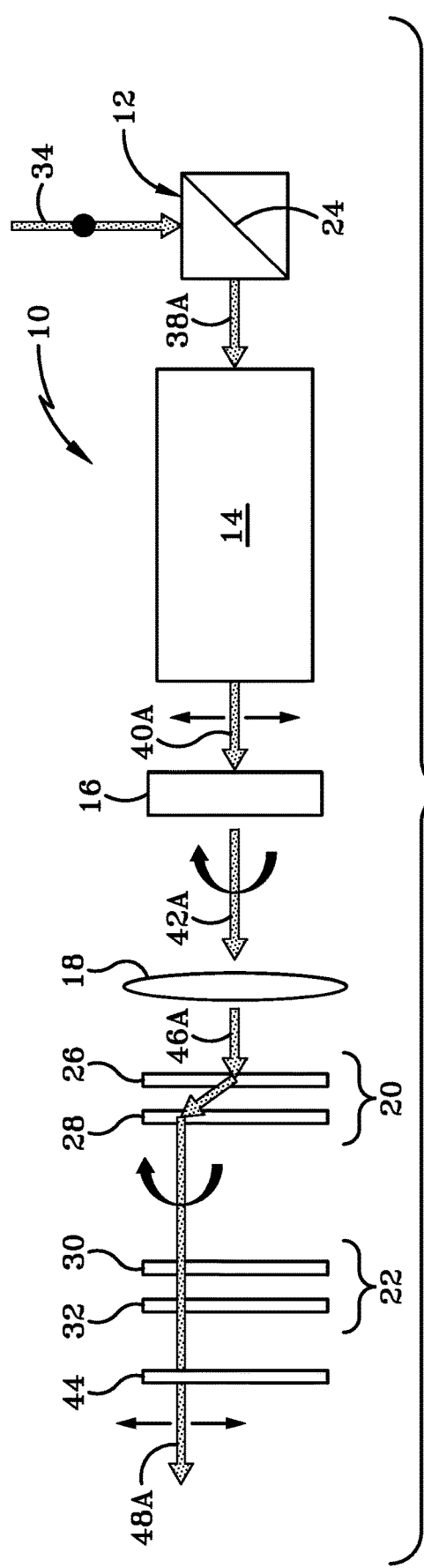
FIG. 2 is a side elevation schematic view of a laser transmission assembly transmitting a first pulse laser beam.
Figure 3:
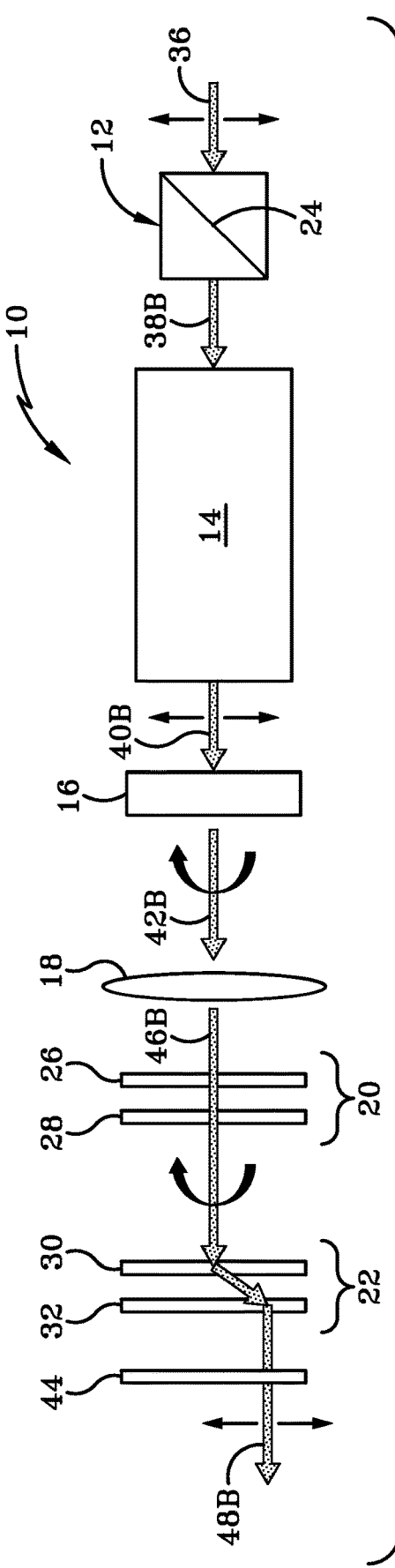
FIG. 3 is a side elevation schematic view of a laser transmission assembly transmitting a second pulse laser beam.

With reference to FIGS. 1-3, transmission assembly 10 may further include a second quarter-wave plate (QWP) 44, which may be a low angle of incidence (AOI) dependence QWP 44. This low AOI dependence QWP 44 may be substantially similar to QWP 16 and may be/or formed of any suitable optical material to provide a desired effect on a beam passing therethrough as discussed further below. According to one aspect, low AOI dependence QWP 44 may also serve as an exit window or exit aperture for transmission assembly 10 in that it may be, or otherwise represent, the last optical element through which a beam may pass before exiting transmission assembly and moving towards its intended target as discussed further below. According to another aspect, an additional optical lens or window may be provided within transmission assembly 10 depending on the desired implementation thereof.

Transmission assembly 10 may further include additional components for normal and expected operation thereof. These additional components may include one or more processor units, which may be a computer, a processor, a logic, a logic controller, a series of logics, or the like which may include or be in further communication with one or more non-transitory storage mediums and may be operable to both encode and carry out a set of encoded instructions contained therein. Any such processor(s) (not shown) may be operated according to their normal and expected function and may control transmission assembly 10 as a dedicated unit or may alternatively control transmission assembly 10 as part of a larger system carried by a platform 52. Any processors or other similar components provided with transmission assembly 10 may be in further communication with other systems or processors of platform 52 as desired or necessary.

With continued reference to FIGS. 1-3, but particular reference to FIGS. 2 and 3, first and second beams 34 and 36 are shown moving through transmission assembly 10, as discussed below. In particular, FIG. 2 represents a first pulse laser beam 34, i.e. a laser generated and directed through transmission assembly 10 first, while FIG. 3 may depict a second pulse laser beam 36 moving through transmission assembly 10 after the first pulse laser beam 34 depicted in FIG. 2. Accordingly, as depicted and described herein, transmission assembly 10 may be a dual pulse or two pulse system which may provide outgoing laser beams that are parallel and aligned with the direction of motion of a platform 52 and are separated by a distance that exactly compensates for the motion of platform 52 over the time between the first and second pulses 34 and 36.

As depicted in FIG. 2, first pulse may be a first beam 34 which may be generated remotely and directed into transmission assembly 10 as discussed further below. This first beam 34 may be a monochromatic and/or coherent laser light that can be used to measure surface displacements in standard shearography applications. As it is contemplated that first beam 34 is generated remotely from transmission assembly 10, it will be therefore understood that a remote beam generator may be utilized to generate first beam 34 and may include any further steering elements including one or more mirrors, collimators, diverging lenses, or the like to generate and direct first beam 34 into transmission assembly 10. According to another aspect, first beam 34 may be any suitable light having any suitable wavelength.

With reference to FIG. 3, second pulse may be a second beam 36 which may likewise be generated remotely from transmission assembly 10 and directed thereto. As with first beam 34, second beam 36 may be a monochromatic and/or coherent laser light utilized measuring surface displacements in shearography applications. In further similarity to first beam 34, second beam 36 may be generated remotely by a remote beam generator that may include one or more steering components or the like to generate and/or direct second beam 36 into transmission assembly 10. According to another aspect, second beam 36 may be any suitable light having any suitable wavelength.

First and second beams 34 and 36 may be provided by separate beam and generators or separate systems in that each of first and second beams 34 and 36 may be considered separate polymerized single-mode lasers that are alternately pulsing. According to one aspect, this arrangement may be utilized as dictated by the per pulse energies required to perform shearography which may not be met or otherwise provided by utilizing a single beam generator. According to another aspect, additional beam generators and or pulses may be generated utilizing multiple beam generators or by alternately pulsing the beam generators for first and second beam 34 and 36 to provide additional laser beam pulses. This may be particularly useful in four-pulse shearography applications or in subsequent measurements as a platform 52 moves over an area to be measured, as discussed further below. According to another aspect, first and second beams 34 and 36 may be provided by a single, continuous wave laser or single pulsed-wave laser generator.

With continued reference to FIGS. 2 and 3, additional beam reference numbers will now be briefly described before providing discussion as to the operation of transmission assembly 10. First beam 34 may be a linearly polarized beam wherein the darkened spot on beam 34 indicates that the beam is moving out of the plane of the figure "paper" and is horizontally linearly polarized in that the polarization of first beam 34 is likewise "in and out of the plane of the paper". Second beam 36 may be linearly polarized as indicated by the bi-directional arrow thereon and may further be vertically polarized.

Each of first and second laser 34 and 36 may have similar processes applied thereto in that both first and second beams 34 and 36 may enter the PBS 12 from separate directions and having opposing linear polarizations (i.e. horizontal versus vertical polarization); however, once encountering PBS 12, as discussed further below, the first and second beams 34 and 36 may substantially directed to a common axis while maintaining their original polarization. As shown in FIGS. 2 and 3, additional reference indicators A and B are applied to the beams 38, 40, 42, 44, 46, and 48, and will be understood to refer to these beams as they relate to first pulse 34 ("A" references, e.g. 38A, 40A . . . ) and second pulse 36 ("B" references, e.g. 38B, 40B . . . ). General references to beams 38, 40, 42, 44, 46, and/or 48 will therefore be understood to be applicable to either first beam 34 and second beam 36 unless specifically stated otherwise.

Accordingly, beam 38 between PBS 12 and the rotator 14 is depicted without a specific polarization in that it may match the polarization of the input beam. For example, in FIG. 2, first beam 34 may be horizontally polarized, therefore beam 38A may likewise be horizontally polarized, whereas in FIG. 3, second beam 36 may be vertically polarized, therefore beam 38B may be similarly vertically polarized. The PBS 12, as discussed herein, may serve to cause both first and second beams 34 and 36 and the subsequent beams 38A and 38B to impinge on the rotator 14 at the same angle.

Beam 40 exiting the rotator 14 may be linearly polarized and may have the same linear polarization regardless of the origination thereof. In particular, the rotator 14 may interact with first beam 34 and/or second beam 36 to ensure that beam 40 exiting therefrom is uniform in polarization. Shown next, beam 40 will pass through QWP 16 and exit as beam 42, which may be circularly polarized, as depicted by the semicircle arrow thereon. Beam 42 may then pass through diverging lens 18, where the beam form may be diffused slightly to reduce the intensity of the beam. This beam is shown as beam 46 which may maintain its circular polarization from QWP 16 and may be referred to as a pre-steering beam 46 (i.e. the final section of first and/or second beam prior to being steered by GP plate pairs 20 and/or 22).

Accordingly, once pre-steering beam 46 encounters first and second GP plate pairs 20 and 22, it may be steered off of a midline axis M (seen in FIGS. 4A-5B and discussed further below) and may then be considered as a "post-steering" or output beam 48 which may again become linearly polarized as it passes through low AOI QWP 44, as discussed further below. This output beam 48 may again be further distinguished as a first output beam 48A, correlating to first beam 34, and a second output beam 48B, correlating to second beam 36, as discussed below.

Accordingly, it will be understood that the difference between beams 38, 40, 42, 46, and 48 is their relative position and polarization as the beam moves through transmission assembly 10. It will be further understood that each of beams 38A, 40A, 42A, 46A, and 48A may be labeled sections of first beam 34 and beams 38B, 40B, 42B, 46B, and 48B may be labeled sections of second beam 36.

As mentioned above, transmission assembly 10 is contemplated as part of a larger shearography system, which may be carried by a platform 52 for use in shearography applications as discussed further below. In particular, and with reference to FIGS. 5A and 5B, platform 52 is shown and generally referred to herein as a helicopter; however, it will be understood that platform 52 may be any moving vehicle or the like of any type that is capable of carrying and operating a shearography system, including transmission assembly 10, thereon. According to one aspect, as further discussed and depicted herein, platform 52 may be a helicopter or another type of aircraft, either manned or unmanned, including other fixed wing and/or rotary aircraft. According to another aspect, platform 52 may be a sea-based or land-based vehicle or may be a man-portable device, i.e. a device that may be carried by one or more persons while being operated. Platform 52 will be discussed further below with regards to the operation of transmission assembly 10.

Having thus described the elements and components of transmission assembly 10, the operation and method of use therefore will not be discussed.

Transmission assembly 10 may be utilized according to the methods described herein to compensate for movement of a platform 52 carrying transmission assembly 10 as described further below. Specifically, transmission assembly 10 may be utilized to steer a transmission beam (i.e. output beam 48) in multiple beam pulses to compensate for motion of the platform 52.

With reference to FIGS. 2 and 3, transmission assembly 10 is shown therein depicting a two-pulse shearography operation wherein FIG. 2 depicts a first laser pulse or laser beam 34 moving through the system and being steered in a first direction, while FIG. 3 shows a second pulse or second beam 36 moving through transmission assembly 10 and being steered in a second direction. As used and understood herein, terms such as "first pulse", "first beam", "first beam pulse" will be understood to refer to first beam 34, unless specifically stated otherwise. Similarly, terms such as "second pulse", "second beam", "second beam pulse" will be understood to refer to second beam 36, unless specifically stated otherwise.

First pulse or first beam 34 may be the laser used to provide the reference measurement taken to establish the reference shear image for a two-pulse shearography application. Similarly, second pulse or second beam 36 may be utilized to generate the second comparison shear image, which may be superimposed on the image produced from first pulse 34 to create a shearogram.

Accordingly, with reference to FIG. 2, a first pulse beam 34 may be directed through transmission assembly 10 with first pulse 34 first being directed from a remote beam generating system or beam generator and into the PBS 12 where it may be reflected to the rotator 14 as beam 38A. As shown and described herein, first beam 34 may have a horizontal linear polarization and may maintain that polarization through the interaction with PBS 12 as it is directed to rotator 14. According to another aspect, first beam 34 may have any suitable polarization at this early stage in the operation of transmission assembly 10.

With reference to FIG. 3, a second pulse beam 36 may be similarly directed through transmission assembly 10 with second pulse 36 first being directed from a remote beam generating system or beam generator and into the PBS 12 where it may be reflected to the rotator 14, also as beam 38B. In contrast to first beam 34, second beam 36 may have a vertical linear polarization and may maintain that polarization through the interaction with PBS 12 as it is directed to rotator 14. According to another aspect, second beam 36 may have any suitable polarization at this early stage in the operation of transmission assembly 10. As mentioned above, once first beam 34 and second beam 36 encounter the PBS 12 and are directed to the rotator 14, they may be substantially identical in form and function until they reach the GP plate pairs 20 and/or 22, where they may be steered, as discussed below. Accordingly, it will again be understood that the description of beams 38, 40, 42, 44, and 46 may apply equally to both first and second beams 34 and 36, unless specifically indicated otherwise.

As beam 38 enters the rotator 14, a voltage may be applied to the rotator 14 to induce a change in polarization within the beam 38 to convert it to a standardized, i.e. consistently similar, beam. In this example, the beam exiting to the rotator 14, shown as beam 40, may be vertically linearly polarized, regardless of the polarization of the beam 38 entering the rotator 14.

Beam 40 may then pass through QWP 16, where the polarization of beam may be converted from linear polarization to a circular polarization and may exit the QWP 16 as circularly polarized beam 42.

The beam 42 leaving QWP 16 may then pass through diverging lens 18, which may again be configured to reduce the intensity of beam 42 while maintaining the circular polarization thereof. As mentioned above, this may protect the GP plates 26, 28, 30, and 32 from the intensity of the beam to prevent burning or otherwise damaging the GP plate pairs 20 and 22. Once this beam passes through diverging lens 18 it is then referred to as pre-steering beam 46, which again is an indication that beam 46 has not been steered away from the midline axis M by one or both of first and second GP plate pairs 20 and 22, as discussed further below.

At this point in the operation of transmission assembly 10, first beam 34 and second beam 36 may be again distinguished from each other in the manner in which they are steered. In particular, as discussed below, first beam 34 may be steered in a first direction, while second beam 36 may be steered in a second, opposite direction. As contemplated herein, first beam 34 may be steered by first GP plate pair 20 and second beam 36 may be steered by second GP plate pair 22; however, it will be understood that either beam 34 or 36 may be steered by either GP plate pair 20 or 22, or alternatively either beam 34 or 36 may be steered by a combination of GP plate pairs 20 and 22.

With reference then to FIGS. 4A-4D, the specific mechanism by which the GP plate pairs 20 and 22 are able to steer pre-steering beam 46A into first output beam 48A (from first beam 34) and pre-steering beam 46B into second output beam 48B (from second beam 36). The resulting difference between first and second output beams 48A and 48B are the direction of steering and their relative displacement from midline axis M. As shown and used herein midline axis M may be an imaginary axis that is equidistant from parallel first and second output beams 48A and 48B and may generally represent the axis along which beams 38, 40, 42, 44, and 46 travel within transmission assembly 10 after exiting PBS 12 (as beam 38) and prior to steering by first and/or second GP plate pairs 20 and/or 22 (as beam 46).

Figure 5A:
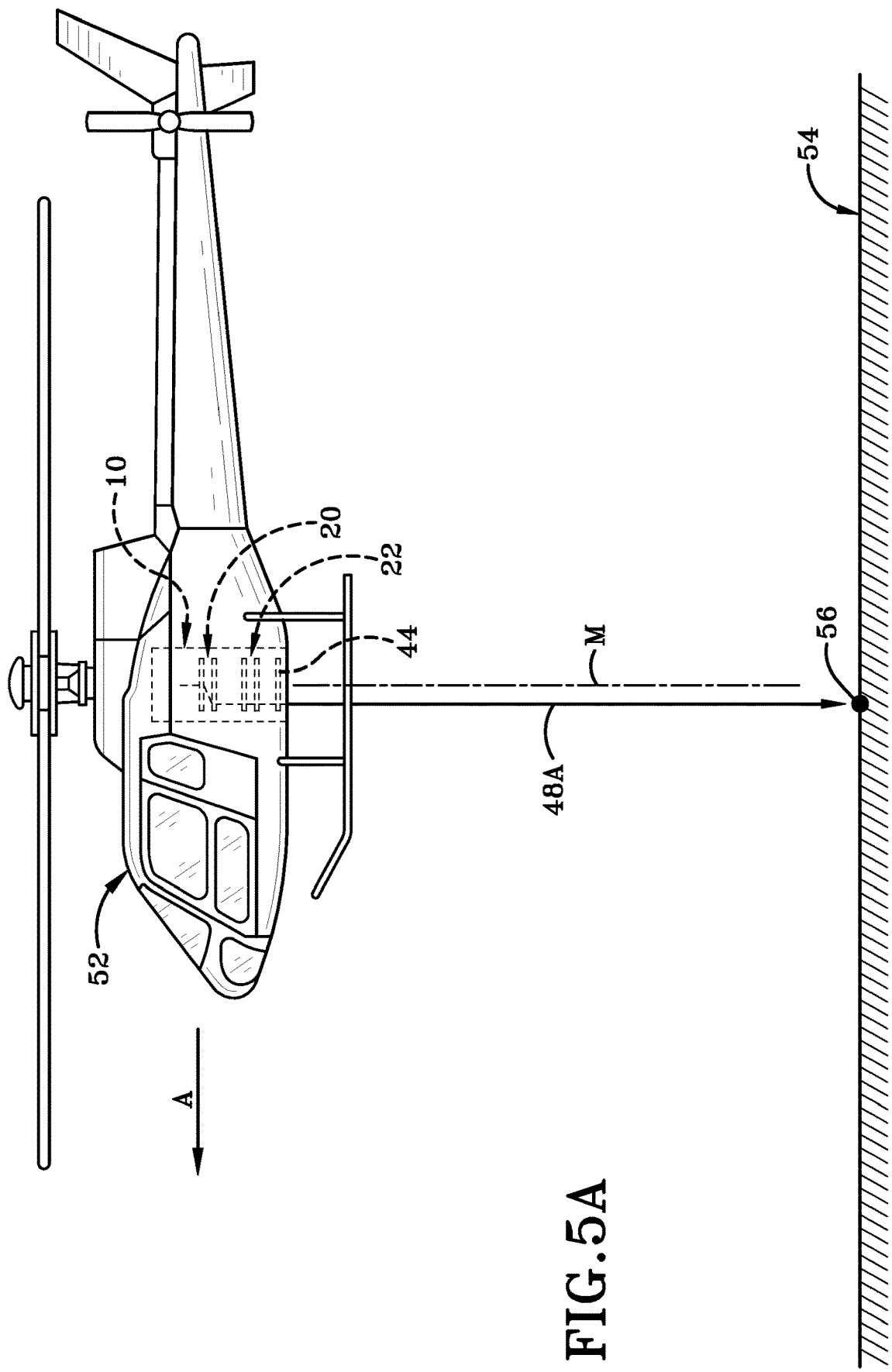
FIG. 5A is a side elevation operation view of a shearography system and platform in a first position according to one aspect of the present disclosure.
Figure 5B:
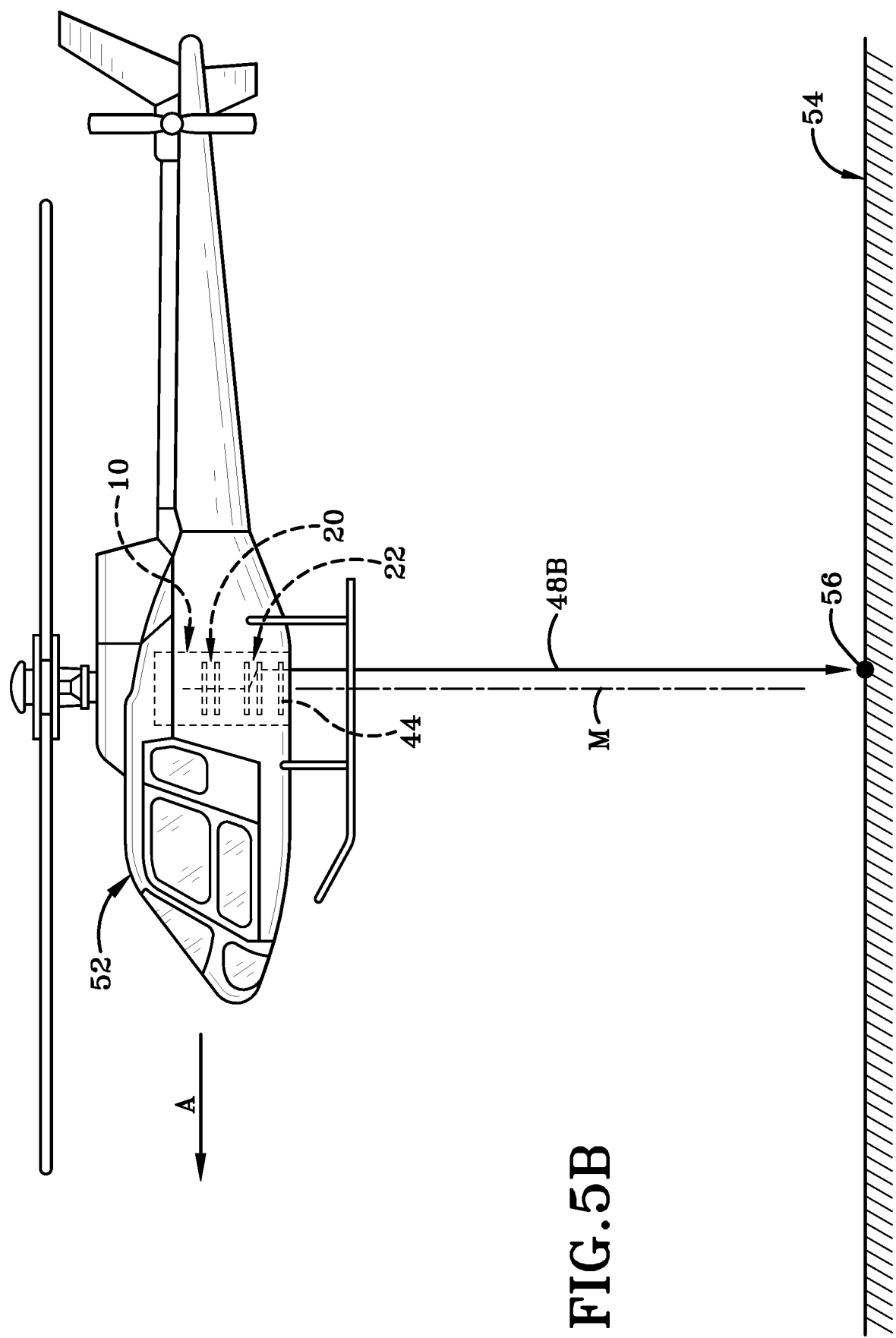
FIG. 5B is a side elevation operation view of the shearography system and platform from FIG. 5A in a second position according to one aspect of the present disclosure.

This midline axis M is best seen in FIGS. 4A-5B. Similarly, the displacement of output beams 48A and 48B are shown as height H1 (for beam 48A) and height H2 (for beam 48B). Although shown and referenced herein as heights H1 and H2 relative to midline axis M, it will be understood that these "heights" are merely representative of the beam displacement in a direction to one side or the other of midline axis M and may be in any direction, including above, below, to the side, forward, or rearward of midline axis M, depending upon the orientation of transmission assembly 10 within a larger system. For example, in FIGS. 1-4D, transmission assembly 10 is shown with a horizontal orientation, so the displacement of output beams 48A and 48B would be "above" and "below" midline axis M. In FIGS. 5a and 5B, transmission assembly 10 is shown with a vertical orientation on a moving platform 52, so the displacement of output beams 48A and 48 may be to the side, and in front of or behind midline axis M. Put another way, the heights H1 and H2 are representative of the distance output beams 48A and 48B are displaced from the midline axis M and are not meant to be a limitation of vertical elevation.

As shown in FIGS. 4A-4C, the black dots at reference 50 indicate the "top" of the GP plates 26 and 28. The term "top" is relative in that GP plates 26 and 28 (and GP plates 30 and 32) may be oriented in any position; however, the illustration of the top, via dot 50, shows how the GP plates 26, 28, 30, and 32 of each plate pair 20 and 22 may have the same orientation. Put another way, the top dot 50 merely represents in these images that both first and second GP plates 26 and 28 in FIGS. 4A, 4B, and 4D are oriented the same way with the "top" to the same side of midline axis M whereas third GP plate 30 and fourth GP plate 32, shown in FIG. 4C, are both oriented such that "top" 50 are both to the opposite side of midline axis M. These orientations are controlled by synchronized rotation of both GP plates 26 and 28 within GP plate pair 20 or of both GP plates 30 and 32 within GP plate pair 22.

Accordingly, as shown in FIG. 4A, beam 46A passing from diverging lens 18 may be steered utilizing first GP plate pair 20. As mentioned above, first and second GP plates 26 and 28 are liquid crystal modulated and may have a voltage activated or voltage deactivated state depending on the applied voltage. In the example shown in FIGS. 4A and 4B, both first and second GP plates 26 and 28 may be in a voltage deactivated state to allow them to function in creating displacement of first beam 46A into first output beam 48A.

Additionally, first GP plate 26 may have an opposite wavefront tilt from second GP plate 28, which may ensure that the incoming beam, i.e. first pre-steering beam 46A, and first outgoing beam, i.e. first output beam 48A, remain parallel. In particular, as first beam 34 (as beam 46A) passes through first plate 26 of first GP plate pair 20, it may be directed or steered away from the midline axis M at an angle. This angle may vary depending upon the desired steering effect; however, for this example, this angle may be 45° from the midline axis M. The opposing wavefront tilt of second GP plate 28 may then cause the first beam 34 to be steered back into parallel with the midline axis M, although at a lateral displacement therefrom. The specific amount of displacement from the midline axis M is discussed further below.

Additionally, when transmission system 10 is used in one or more of the additional applications mentioned above, the use of first and second GP plate pairs 20 and 22 may allow access to four beam deviations. Specifically, GP plate pairs 20 and 22 may allow for zero deviation from the midline axis M, a first angle deviation in a first direction, a second angle deviation in a second direction, and a sum of the first and second angles (which may be zero, as in shearography). As provided herein, these deviations are in addition to the variable lateral displacement of the beam from midline axis M. Paired together with actuators or motors for rotating the prisms and varying the prism separation, this enables a variety of scan patterns within the maximum angular field of view that the GP plate pairs 20 and 22 can address.

Although not shown in FIGS. 4A and 4B, during the first pulse 34, the third and fourth GP plates 30 and 32 of second GP plate pair 22 may be in a voltage activated state, which may allow the first output beam 48A to pass therethrough unaffected after being steered with first GP plate pair 20. The voltage states of GP plate pairs 20 and 22 are discussed further below with reference to FIG. 4D.

The magnitude of first output beam's 48A displacement from the midline axis M may be controlled by increasing the distance, represented by Arrow D in FIG. 4B, between the first and second GP plates 26 and 28 of the GP plate pair 20. Similar mechanism, namely, increasing or adjusting the distance between third and fourth plates 30 and 32 of second GP plate pair 22 will be understood to operate identically to control the magnitude displacement of beam 48B from midline axis M.

First pulse 34 then may be controlled by the first GP plate pair 20 to be displaced from midline axis M by a predetermined distance that would be equal to a portion of the distance that platform 52 may travel between first pulse 34 and second pulse 36. This distance is again represented by height H1 in FIG. 4B.

Most commonly, the displacement of first pulse 34 may be equal to one-half the total distance of travel of platform 52; however, it will be understood that the displacement of first pulse may be more than or less than one-half the total travel distance of platform 52 provided that the combination of the displacement of first beam 34 and the displacement of second beam 36 is equal to the complete and total distance of travel for platform 52. For example, where the displacement (height H1) of first beam 34 is 50%, the displacement (height H2) of second beam 36 is likewise 50% of the total travel distance of platform 52 (i.e. H1=H2). According to another example, the displacements of first and second beams 34 and 36 could be any suitable proportion totaling 100% of the distance traveled by platform 52 (i.e. H1+H2=100% of the distance traveled by platform 52).

Accordingly, as seen in FIG. 4C, second pulse 36 may be displaced from midline axis M by an opposite distance representing the remainder of the distance platform 52 may travel between the two laser pulses. This distance is again represented by height H2 in FIG. 4C. Collectively, the distance between output beam 48 of first pulse and output beam 48 of second pulse will exactly compensate for the distance the platform 52 travels between the two pulses, as described above.

Similar to the situation with first pulse 34, FIG. 4C represents second pulse 36 being steered by second GP plate pair 22. Unlike the first pulse 34, both third and fourth GP plates 30 and 32 are in a voltage deactivated state during second pulse 36 to allow them to function in creating displacement of second beam 46A into output beam 48A. Additionally, as with first and second GP plates 26 and 28, third GP plate 30 may have an opposite wavefront tilt from fourth GP plate 32, which may ensure that the incoming beam, i.e. second pre-steering beam 46B, and the second outgoing beam, i.e. second output beam 48B, remain parallel. Because the second pre-steering beam 46B must first pass through first and second GP plates 26 and 28 of first GP plate pair 20, both first and second GP plates may be in a voltage activated state to allow second pre-steering beam 46B to pass therethrough unaffected. This is shown generally in FIG. 4D where pre-steering beam 46 passes through first and second GP plates 26 and 28 unaffected to become output beam 48. Although not illustrated, pre-steering beam 46 would pass through third and fourth GP plates 30 and 32 in a similar fashion.

With reference to FIG. 4D, allowing either pre-steering beam 46 and/or output beam 48 to pass through GP plates 26, 28, 30, and/or 32 unaffected may be accomplished by applying a voltage to the GP plates 26, 28, 30, and/or 32, intended to allow the beam 46 and/or 48 to pass through to deactivate or otherwise disable the liquid crystal geometric phase beam steering capabilities thereof.

According to another aspect, if it is desirable to transmit a beam out from transmission assembly 10 without any element of beam steering applied thereto, all GP plates 26, 28, 30, and/or 32 may be voltage activated in the liquid crystal geometric phase beam steering capabilities may be disabled, thus allowing pre-steering beam 46 and/or output beam 48 to remain on the same plane, i.e. along midline axis M. For example, in a scenario wherein shearography that is normally performed from a moving platform 52 is being performed by a stationary platform 52, such as by a hovering helicopter, it may be desirable to generate both beam pulses 34 and 36 in the same position, i.e. with no displacement from midline axis M.

Once output beams 48A and 48B are steered by first and second GP plate pairs 20 and 22, respectively, they may pass through low AOI dependence QWP 44 where they may be converted from being circularly polarized to linearly polarized.

With reference to FIGS. 5A and 5B, operational views illustrating one example of shearography being performed by a moving platform 52, shown herein for this example as helicopter 52 will now be described. According to this example, helicopter 52 may be moving in the direction indicated by Arrow A above a surface 54, which may be a ground surface or the like, and may further be performing shearography on a portion of that surface 54, indicated by target spot 56.

FIG. 5A is representative of a first pulse beam 34 for generating the first reference shear image, while FIG. 5B is representative of a second pulse beam 36 for generating the second shear image in producing a shearogram. In both FIGS. 5A and 5B, transmission assembly 10 is shown as a generic representation within helicopter 52 and is only shown in part, including first and second GP plate pairs 20 and 22 and low AOI dependence QWP 44. Other elements and aspects of transmission assembly 10 previously described herein are omitted from FIGS. 5A and 5B simply for clarity and will be understood to be present and operating according to the methods of use described previously herein. Further, with respect to beams, only output beams 48A and 48B are shown with first output beam 48A in FIG. 5A representing first pulse beam 34 taken with helicopter 52 in a first position and second output beam 48B in FIG. 5B representing second pulse beam 36 taken with helicopter 52 in a second position.

Accordingly, as shown in FIG. 5A, a first pulse beam 34 may be generated and directed through transmission assembly 10 as described above. First beam pulse 34 may be steered by first beam pair 20 to be displaced ahead of midline axis M of transmission assembly 10 and out of transmission assembly 10 to target spot 56 on surface 54. Beam 48A is considered "ahead" of midline axis M in this example in that it is displaced therefrom in the direction of travel of helicopter 52, again as indicated by Arrow A. For beam 48A to hit target spot 56 ahead of midline axis M necessarily provides that midline axis M is behind target spot 56 by one-half the distance helicopter 52 will travel between the first beam pulse 34 and second beam pulse 36.

As shown in FIG. 5B, as helicopter 52 moves between first beam pulse 34 and second beam pulse 36, second beam 36 may be directed through transmission assembly 10 and steered by second GP plate pair 22 and out of transmission assembly 10 behind the midline axis M of transmission assembly 10. As depicted therein, midline axis M is now ahead of target spot 56 by one-half the distance helicopter 52 moved between first beam pulse 34 and second beam pulse 36. This allows output beam 48B of second beam pulse 36 to remain parallel to output beam 48A of first beam pulse 34 and also hit target spot 56.

Accordingly, the steering of first beam pulse 34 ahead of midline axis M and the steering of second beam pulse 36 behind midline axis M, relative to the direction of travel of helicopter 52, allows for two parallel output beams 48A and 48B that are equidistant from the midline axis M to be directed accurately to target spot 56 while appearing from the perspective of the target spot 56 to have originated from an identical point.

As mentioned above, the displacement of output beams 48A and 48B of first and second beam pulses 34 and 36, respectively, may be adjusted by increasing or decreasing the separation D between the GP plates 26, 28, 30, and 32 within first and second GP plate pairs 20 and 22. The degree of displacement may be determined by the velocity of the platform 52 to align the displacement of output beams 48A and 48B to exactly compensate for the motion of the platform 52. Similarly, the direction of displacement to either side of midline axis M may be controlled by synchronized rotation of first and second GP plates 26 and 28 of first GP plate pair 20 and 22 and/or by synchronized rotation of third and fourth GP plates 30 and 32 of second GP plate pair 22.

This again may provide a multi-pulse shearography output beam 48 that appears to impinge on the target spot 56 at the same angle, thus appearing to be multiple pulses of a single beam originating from a single spot rather than multiple pulses separated by a distance. This may allow transmission assembly 10 to exactly compensate for motion of platform 52 while performing shearography on a surface 54.

In some cases, such as for 3-pulse or 4-pulse shearography, it may be advantageous to extend the system design from using a first and second beam to using a third, a fourth, or more beams. This can readily be effected by adding additional GP plate pairs into the optical path shown in FIGS. 2 and 3, by placing the additional pairs between diverging lens 18 and the low angle of incidence (AOI) dependence QWP 44. According to this example, one additional GP plate pair may be added for each additional beam (e.g. a third plate pair for a third beam and a fourth plate pair for a fourth beam, etc.). According to another aspect, existing plate pairs may be utilized to steer additional beam pulses. For example, first GP plate pair 20 may be used to steer a first beam pulse 34 and a third beam pulse while second GP plate pair 22 may be used to steer second beam pulse 36 and a fourth beam pulse. Any suitable number of plate pairs may be provided relative to the number of beams utilized.

The use of geometric phase plate pairs, such as first GP plate pair 20 and second GP plate pair 22, in place of fast steering mirrors and/or Risley prisms may provide advantages in that GP plate pairs 20 and 22 are more compact than both fast steering mirrors and/or Risley prism pairs, the transmission angles of the beams 34 and 36 are more adjustable, and the GP plate pairs 20 and 22 may further offer the possibility of shaping beams 34 and 36 to provide specifically desired illumination patterns. Further, the ability to rapidly steer beams 34 and 36 with simple movements, such as changing the separation between plates of either pair 20 or 22, as well as a simple voltage on/voltage off activation status may allow for systems that are smaller and more compact, have a lighter weight, reduced power consumption, and a reduced cost thereto. These advantages of transmission assembly 10 utilizing two laser pulses 34 and 36 are in addition to the ability of transmission assembly 10 to appear stationary from the perspective of the target spot 56, thus allowing for accurate shearography results while performing shearography from a moving platform 52.

Figure 6:
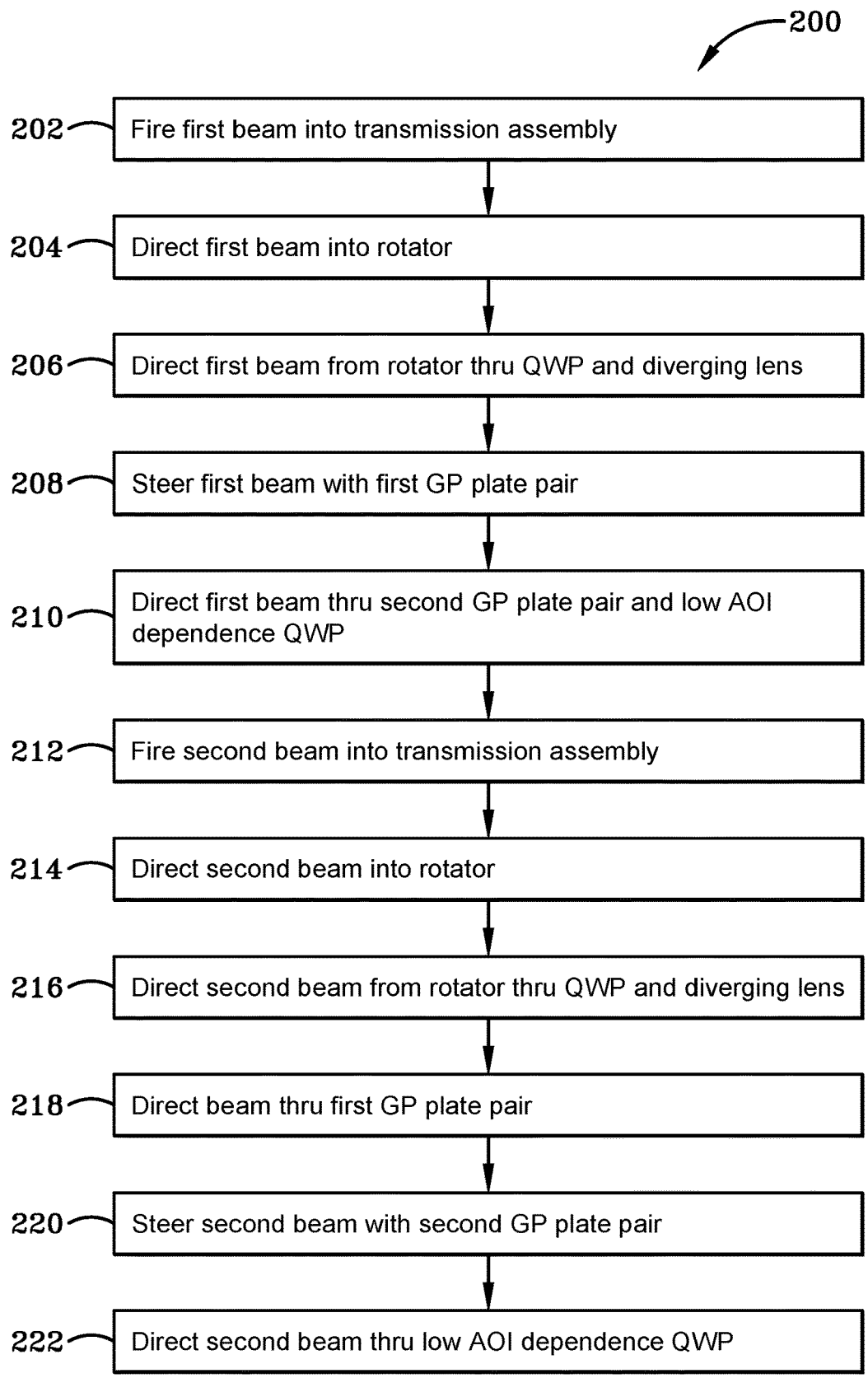
FIG. 6 is an exemplary flow chart representation of a method of performing shearography utilizing a laser transmission assembly according to one aspect of the present disclosure.

With reference to FIG. 6, an exemplary flow chart of the operation of transmission assembly 10 is shown and generally indicated as process 200. Process 200 is a general representation of an exemplary operation of transmission assembly 10. Accordingly, the first stage in process 200 is to fire a first laser beam 34 into transmission system 10 indicated at reference 202. Next, beam 34 will travel through PBS 12 and into the rotator 14 as beam 38A, as indicated at reference 204.

The beam 40A may exit rotator 14 and be directed through QWP 16 and diverging lens 18 (as beam 42A) before encountering first GP plate pair 20 and first GP plate 26. Then at reference 208, first beam pulse 34 (as first pre-steering beam 46A) may be steered or displaced by first GP plate pair 20 before passing through the second GP plate pair 22, and out through low AOI dependence QWP 44, as output beam 48A. Steering the first beam 34 with first GP plate pair 20 is indicated at reference 208, while further directing the beam out through second GP plate pair 22 and low AOI dependence QWP 44 is indicated at reference 210. As discussed above, beam may pass through second plate pair 22 through operation of applying a voltage to third and fourth plates 30 and 32 to prevent further steering of output beam 48A.

Next in process 200, second beam 36 may be fired into transmission assembly 10 and directed through PBS 12 and into rotator 14 as beam 38B. The action of firing the second beam is indicated at reference 212 and directing the beam into the rotator 14 is indicated at reference 214 in FIG. 6. As with first beam 34, second beam 36 may then be directed from the rotator 14 (as beam 40B) through the QWP 16 (as beam 42B) and diverging lens 18 (as beam 44B) before encountering first GP plate pair 20 (as second pre-steering beam 46B). Directing the second beam 36 from the rotator 1 through the QWP 16 and diverging lens 18 is indicated at reference 216 in process 200.

Next, at reference 218, the pre-steering beam 46B beam may pass through first GP plate pair 20 before being steered by second GP plate pair 22, as previously described herein. The steering of second beam with second GP plate pair 22 is indicated at reference 220. From there, second beam may be directed through low AOI dependence QWP 44 and out of transmission assembly 10 as second output beam 48B. This is indicated at reference 222 of process 200.

As previously mentioned herein, the present disclosure relates to motion compensation for shearography on one aspect of a shearography system, namely, the transmission component of the system. Transmission assembly 10 will therefore be understood to be compatible with, or otherwise utilized with, a receiving assembly of a shearography system as dictated by the desired implementation. Further, transmission assembly 10 may be readily adapted for use with any suitable receiving assembly and/or shearography system performing multiple pulse shearography from a moving platform. It will be further understood that transmission system 10 may be readily and adapted for use with legacy systems and/or legacy assets within shearography systems, including existing legacy configurations of shearography systems carried on a platform, as dictated by the specific installation parameters and type of platform used. Similarly, the methods of use therefore may be readily adapted for use with legacy systems with relatively minor modifications thereto, where necessary.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A laser transmission assembly comprising:
   a polarizing beam splitter operable to direct a first laser beam pulse and a subsequent second laser beam pulse through a series of optical components within the transmission assembly; and
   at least one pair of geometric phase (GP) plates;
   wherein the at least one pair of GP plates are operable to steer the first laser beam pulse away from a midline axis of the transmission assembly in a first direction and to steer the second laser beam pulse away from the midline axis of the transmission assembly in a second direction such that the first and second laser beam pulses appear to originate from a single point; and
   wherein the at least one pair of GP plates further comprises:
   a first pair of GP plates operable to steer the first laser beam pulse away from the midline axis of the transmission assembly in the first direction; and
   a second pair of GP plates operable to steer the second laser beam pulse away from the midline axis of the transmission assembly in the second direction.

2. The laser transmission assembly of claim 1 wherein the first pair of GP plates further comprise:
   a first liquid crystal modulated geometric phase grating operable to steer the first beam pulse away from the midline axis at an angle thereto; and
   a second liquid crystal modulated geometric phase grating operable to steer the first beam pulse back into parallel with the midline axis.

3. The laser transmission assembly of claim 2 wherein the second pair of GP plates further comprise:
   a third liquid crystal modulated geometric phase grating operable to steer the second beam pulse away from the midline axis at an angle thereto; and
   a fourth liquid crystal modulated geometric phase grating operable to steer the second beam pulse back into parallel with the midline axis.

4. The laser transmission assembly of claim 3 wherein the first and second liquid crystal modulated geometric phase gratings are movable to increase and decrease the degree of beam displacement of the first laser beam pulse from the midline axis of the transmission assembly by increasing and decreasing the distance between the first and second liquid crystal modulated geometric phase gratings; and
   wherein the third and fourth liquid crystal modulated geometric phase gratings are movable to increase and decrease the degree of beam displacement of the second laser beam pulse from the midline axis of the transmission assembly by increasing and decreasing the distance between the third and fourth liquid crystal modulated geometric phase gratings.

5. The laser transmission assembly of claim 4 wherein the first and second liquid crystal modulated geometric phase gratings are oriented in an opposite direction from the third and fourth liquid crystal modulated geometric phase gratings.

6. The laser transmission assembly of claim 1 further comprising:
   a movable platform operable to carry the transmission assembly thereon.

7. The laser transmission assembly of claim 6 wherein the movable platform is operable to travel from a first position to a second position between the first laser beam pulse and the subsequent second laser beam pulse.

8. The laser transmission assembly of claim 7 wherein the first beam pulse is displaced from the midline axis in the first direction by a distance equal to at least a portion of a distance traveled by the movable platform between the first and second positions.

9. The laser transmission assembly of claim 8 wherein the second beam pulse is displaced from the midline axis in the second direction by a distance equal to the remainder of the distance traveled by the movable platform between the first and second positions.

10. The laser transmission assembly of claim 7 wherein the combined displacement of the first beam pulse from the midline axis in the first direction and the displacement of the second beam pulse from the midline axis in the second direction is equal to the total distance the movable platform travels between the first and second positions.

* * * * *